United States Patent
Rapeanu et al.

(10) Patent No.: US 7,226,195 B2
(45) Date of Patent: Jun. 5, 2007

(54) COLD-CATHODE FLUORESCENT LAMP ASSEMBLY FOR LIGHTING APPLICATIONS

(75) Inventors: Radu C. Rapeanu, Mont-Royal (CA); Viorel Mirica, Brossard (CA); Zhigang Xing, Montreal (CA); David Blier, Verdun (CA)

(73) Assignee: Thomas & Betts International, Wilmington, DE (US)

( * ) Notice: Subject to any disclaimer, the term of this patent is extended or adjusted under 35 U.S.C. 154(b) by 79 days.

(21) Appl. No.: 10/898,649

(22) Filed: Jul. 23, 2004

(65) Prior Publication Data

US 2006/0018108 A1    Jan. 26, 2006

(51) Int. Cl.
G09F 13/18 (2006.01)

(52) U.S. Cl. .................. 362/559; 362/217; 362/221; 362/222; 362/223; 362/225; 362/235; 362/240; 362/244; 362/245; 362/260; 362/317; 362/329; 362/330; 362/609; 362/614; 362/615; 362/632; 40/541; 40/545; 40/546; 40/570

(58) Field of Classification Search ............... 362/240, 362/317, 812, 217, 221–225, 235, 244, 245, 362/260, 268, 329–331, 559, 614, 615, 632, 362/20, 609; 40/541, 545, 570, 546
See application file for complete search history.

(56) References Cited

U.S. PATENT DOCUMENTS

| | | | |
|---|---|---|---|
| 4,435,743 A | 3/1984 | Plumly | 362/20 |
| 4,642,736 A | 2/1987 | Masuzawa et al. | 362/31 |
| 4,648,690 A | 3/1987 | Ohe | 350/321 |
| 4,777,749 A * | 10/1988 | Leo, Sr. | 40/546 |
| 4,947,300 A * | 8/1990 | Wen | 362/183 |
| 6,108,060 A * | 8/2000 | Funamoto et al. | 349/65 |
| 6,135,620 A | 10/2000 | Marsh | 362/377 |
| 6,471,388 B1 | 10/2002 | Marsh | 362/559 |

* cited by examiner

Primary Examiner—Stephen F Husar
Assistant Examiner—Meghan K. Dunwiddie
(74) Attorney, Agent, or Firm—Hoffman & Baron, LLP

(57) ABSTRACT

A compact and cost-efficient lamp assembly includes cold-cathode fluorescent lamps in a variety of edge-lit display sign applications specifically, in edge-lit emergency lighting signs. The lamp assembly includes in one self-contained module a lower housing unit and an upper housing unit shaped to cover the lower housing unit. The lower housing unit is divided into a lower frame and an upper frame disposed on top of the lower frame. The upper frame has at least two inverters disposed within. The lower frame is a parabolic shape reflector frame supporting at least two cathode lamps in line with the two inverters, each of which is connected to each lamp for providing high voltage to power up the lamps. Additionally, an edge-lit panel having a front and back side is disclosed in the present invention. The backside includes a semi-transparent frosted surface with a white opaque lamination glued on the frosted surface. A legend is printed on the front side using a first white layer and a colored second layer of semi-transparent materials. So, when the light passes through the first layer it is split in such a manner that part of the light is reflected back into the panel and the other part of the light illuminates the second colored layer.

25 Claims, 5 Drawing Sheets

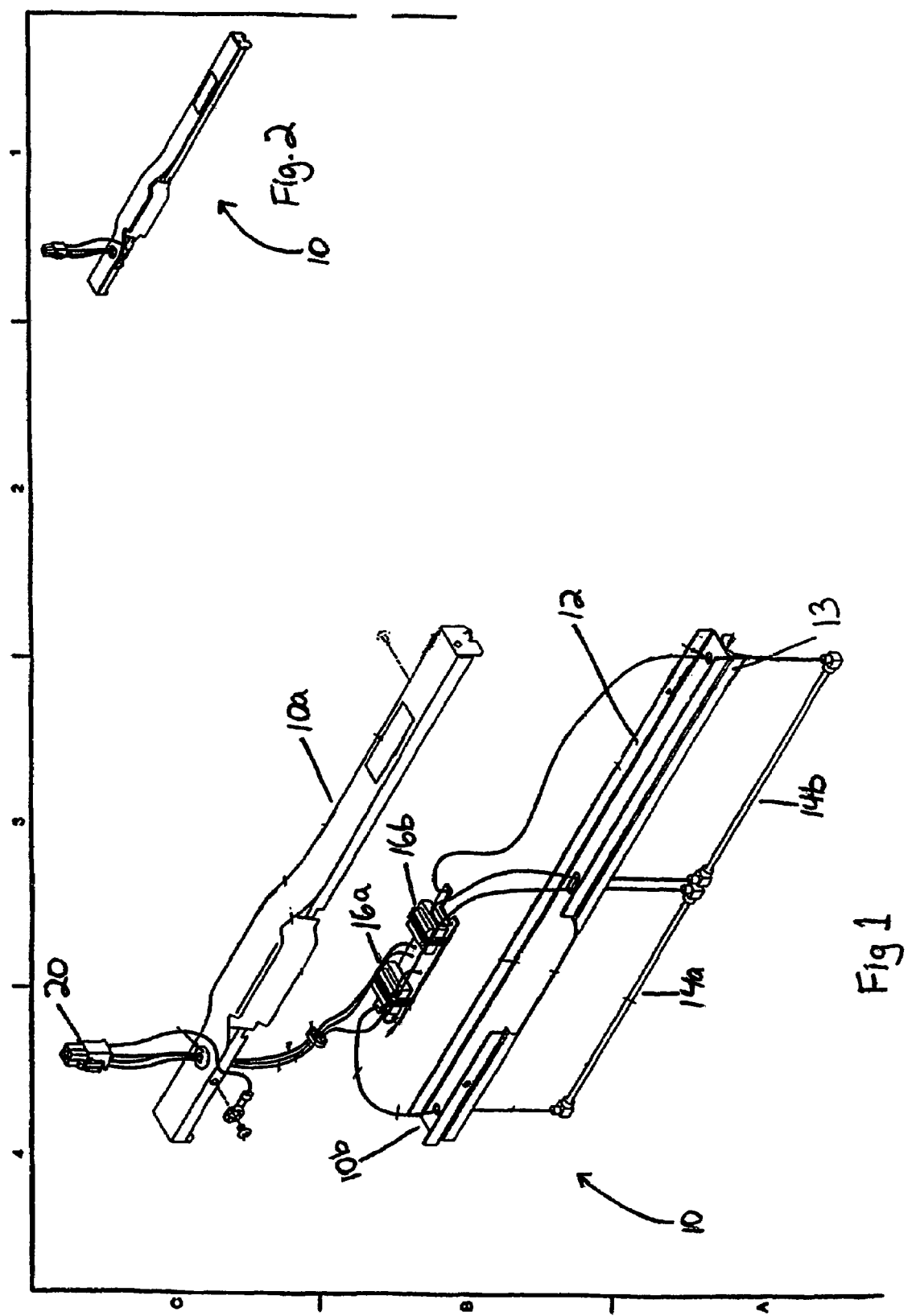

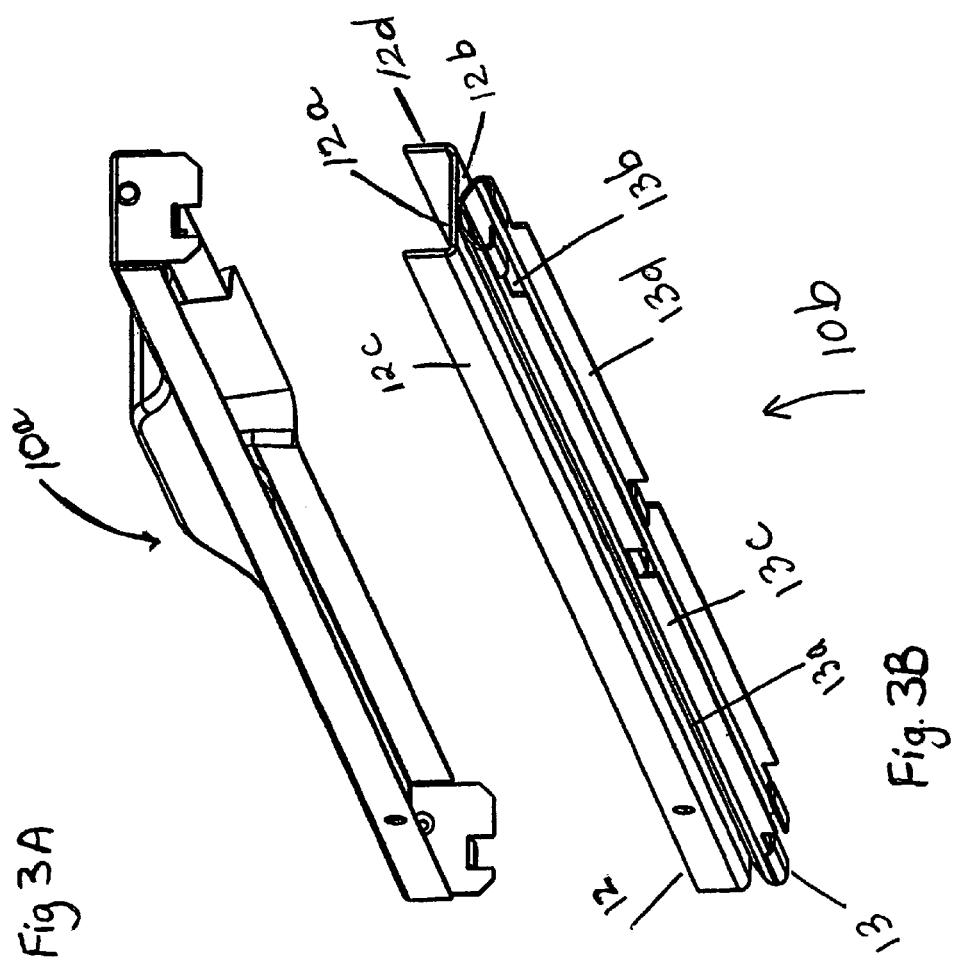

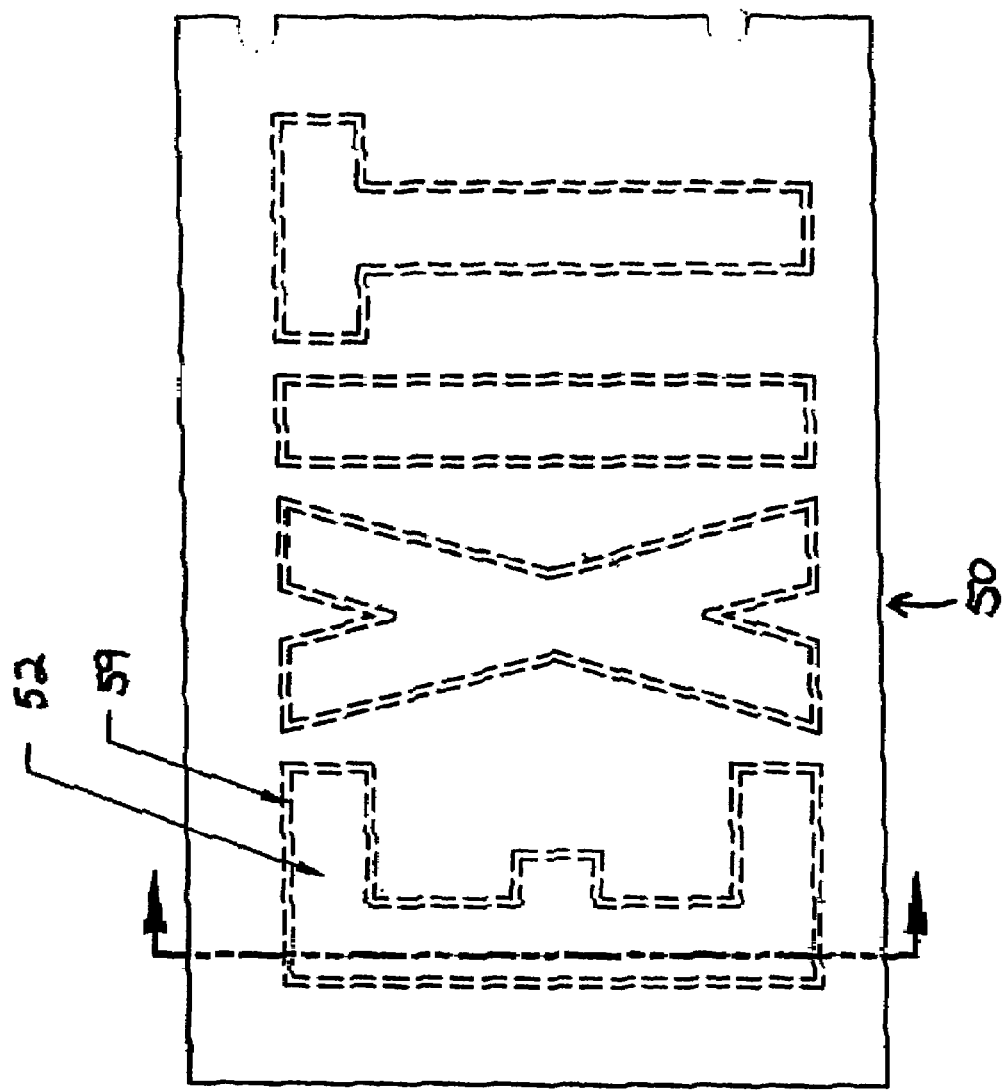
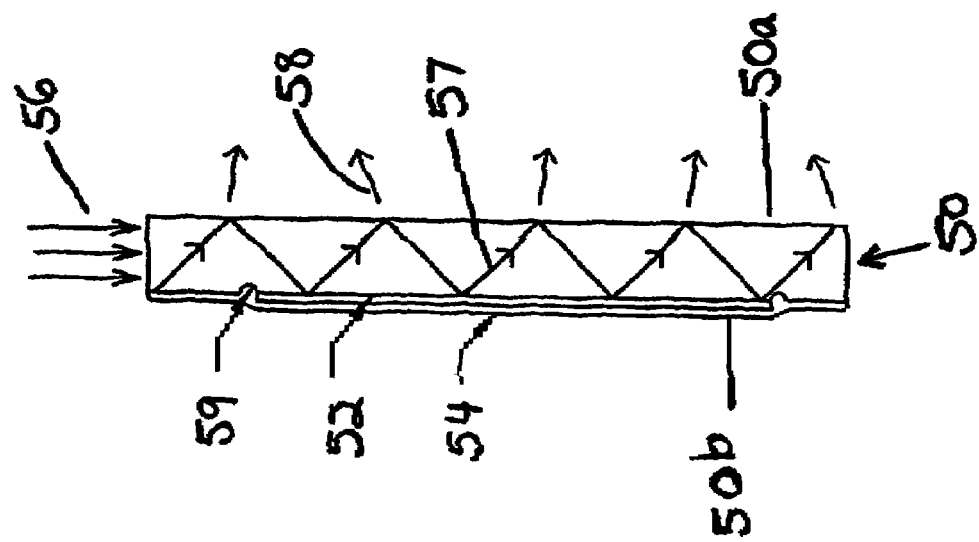
Fig. 5 (Prior Art)

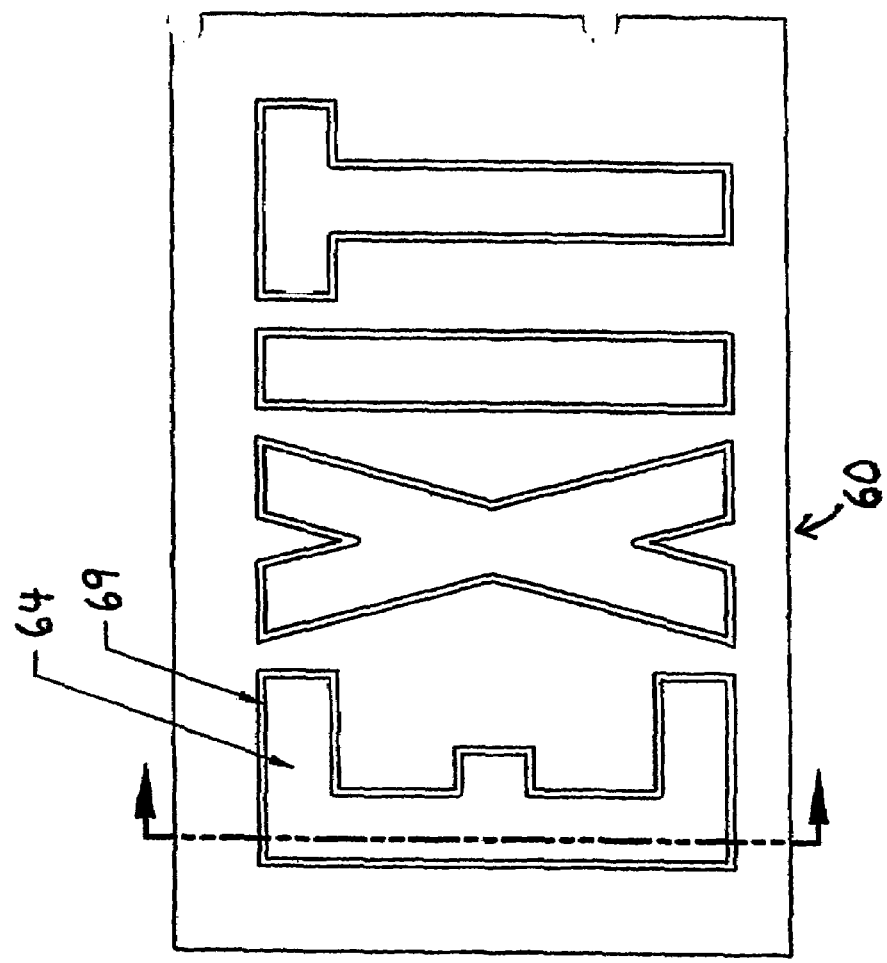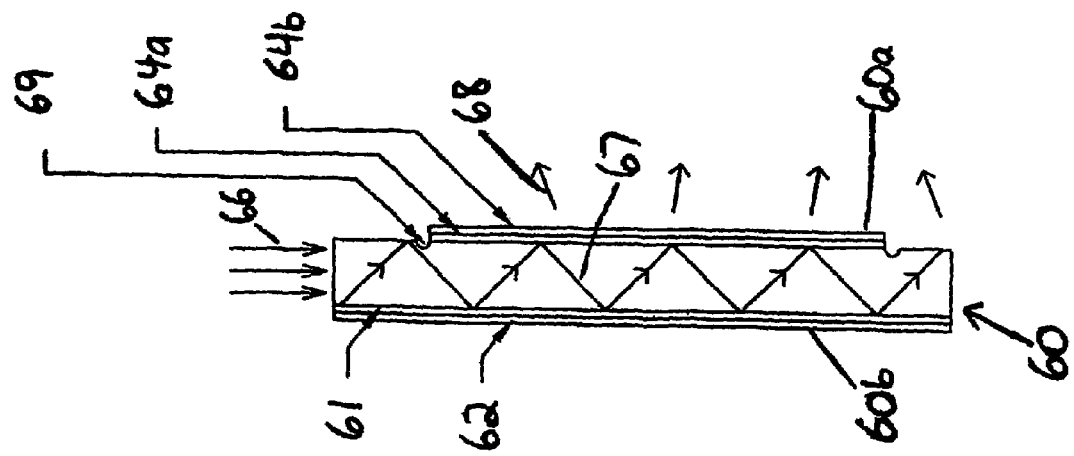
Fig. 6

COLD-CATHODE FLUORESCENT LAMP ASSEMBLY FOR LIGHTING APPLICATIONS

FIELD OF THE INVENTION

The present invention relates generally to lighting sign applications and more specifically to a compact and cost-efficient assembly employing cold-cathode fluorescent lamps in edge-lit emergency lighting signs.

BACKGROUND OF THE INVENTION

The use of cold-cathode fluorescent lamps for general applications is well known in the art. U.S. Pat. No. 6,135,620, incorporated by reference herein, is one example showing the use of such lamps in EXIT signs, traffic signals, light bulbs and for general lighting applications.

Cold-cathode fluorescent lamps are desirable since they are more efficient and offer savings in both energy consumption and operating expenses. Such cold-cathode lamps operate at a very low current (although the voltage is quite high) and they have a longer life when compared with standard fluorescent lamps. Cold-cathode fluorescent lamps are low power consumption lamps with long life expectancy and low maintenance requirements. These lamps are often used to provide background illumination in various lighting applications. Cold-cathode fluorescent lamps require a substantial AC voltage typically several hundred volts, in order to achieve optimal light output. Although the frequency at which a cold-cathode lamp is driven varies, typically they are operated at a drive current frequency on the order of about 10–50 KHz, and have a life expectancy of 15,000–25,000 hours.

One difficulty with these types of lamps, as addressed by the above patent, is in making it easy to install and replace them. Generally cold-cathode fluorescent lamps are stand-alone tubes having a variety of plugs and wires extending therefrom for insertion into a dedicated socket. Due to the fragility of the lamp itself, extreme care must be taken during such installation as well as in shipping, handling and storage. Additionally, as indicated above, voltages required for cold-cathode fluorescent lamp operation are generally high (upwards of 1500 VAC) and thus inserting such a lamp when the fixture is still powered creates the potential for electrical shock.

Additionally, the lamp assembly using an edge-lit panel for emergency light signs such as a lighted exit sign is well known in the art. Typically, the panel includes a front side and back side having two layers of paint, a colored layer for legend and a white layer for the background. The light coming through illuminates both the legend and the background while traveling through multiple reflections and refractions on panel surfaces.

Traditionally, a prior art edge-lit panel 50 of an exit or any other sign as shown in FIG. 5 consists of a glass or plastic (acrylic) panel having a front side 50a and backside 50b. The panel 50 typically has two layers of paint (screening), a layer 52 for the legend text (usually red or green color) and a white layer 54 for the background. The layers 52 and 54 are screened on the backside 50b of the panel (the legend is in a mirror). As an option the legend may have an engraved contour 59 which is typical .1" depth and width on the backside of the acrylic panel 50 to accentuate the contrast between the legend and background. The light 56 as shown by vertical lines falls from the top edge of the panel 50 illuminates both the legend 52 and background 54 while traveling through multiple reflections 57 and refractions 58 on the surfaces of the panel 50.

This method has several disadvantages. First, poor uniformity of the background illumination (shadow around the legend letters), poor contrast ratio between the legend 52 and background 54, and a certain colored light migration (pink shadow) from the legend 52 to the surrounding background 54, due to the multiple light reflections 57. In order to meet the UL924 visibility requirements for exit signs, the edge-lit panel 50 must be exposed to intense light sources (e.g.: two 8-Watt fluorescent lamps) which consume electrical power and dissipate heat.

In U.S. Pat. No. 4,435,743, there is shown an edge-lit sign or panel that has a translucent light reflecting layer formed of white paint applied to the backside. Further, two opaque layers are applied to the front side of the device. In this method, the legend is not internally illuminated, which makes the panel look black and white, i.e., the legend remains black in complete darkness. Therefore, this design would not meet the requirements for a colored legend in both stand-by (AC) and emergency mode.

Therefore, it is thus desirable to make an edge-lit panel to overcome these disadvantages to provide an improved uniform brightness on the panel surface.

SUMMARY OF THE INVENTION

In one embodiment of the present invention, there is provided a cold-cathode fluorescent lamp light assembly including a lower housing unit and an upper housing unit shaped to cover the lower housing unit. The lower housing unit is divided into an upper frame and a lower frame, where the lower frame includes a light reflector incorporated therein. The lamp assembly also includes a first and second cathode lamps disposed within the lower frame, where the first and second cathode lamps function independent of each other. Additionally, a first electrical circuit is disposed within the upper frame and connected to the first cathode lamp and a second electrical circuit is disposed within the upper frame and connected to the second cathode lamp. The first and second electrical circuits function independent of each other.

In an another embodiment of the present invention, there is provided an edge-lit display light sign assembly including a parabolic-shaped reflector frame having top and bottom surfaces, and side walls extending from at least a first end to a second end. An upper frame is disposed on the top surface of the reflector frame. Also, at least one cold-cathode fluorescent lamp is disposed within the reflector frame where the reflector frame reorients radial beams from the lamp into parallel light beams. Furthermore, at least one essentially semi-transparent elongated, protective panel is attached to the reflector frame extending from the first end to the second end, so the parallel light beams are directed into the panel.

In an even further embodiment of the present invention, there is provided an edge-lit panel having a front side and a backside. The backside includes a semi-transparent frosted surface. A white opaque lamination is glued onto the frosted surface. A legend is printed on the front side using first and second layers of semi-transparent materials. The first layer is white and the second layer is colored. As light passes through the first layer it splits in a manner that part of the light is reflected back into the panel and the other part of the light illuminates the second layer.

BRIEF DESCRIPTION OF THE DRAWINGS

FIG. 1 is an exploded perspective view of the component parts of the invention.

FIG. 2 is a top perspective view of the assembled unit of FIG. 1.

FIGS. 3A and 3B are exploded perspective views of the upper and lower housing units, respectively, of the assembly.

FIGS. 3C and 3D are section views of the upper and lower housing units, respectively of the assembly.

FIG. 5 is a perspective view of a prior art edge-lit emergency exit sign.

FIG. 6 is a perspective view of an edge-lit emergency sign of the present invention.

DETAILED DESCRIPTION OF THE PREFERRED EMBODIMENT

Figure 4:
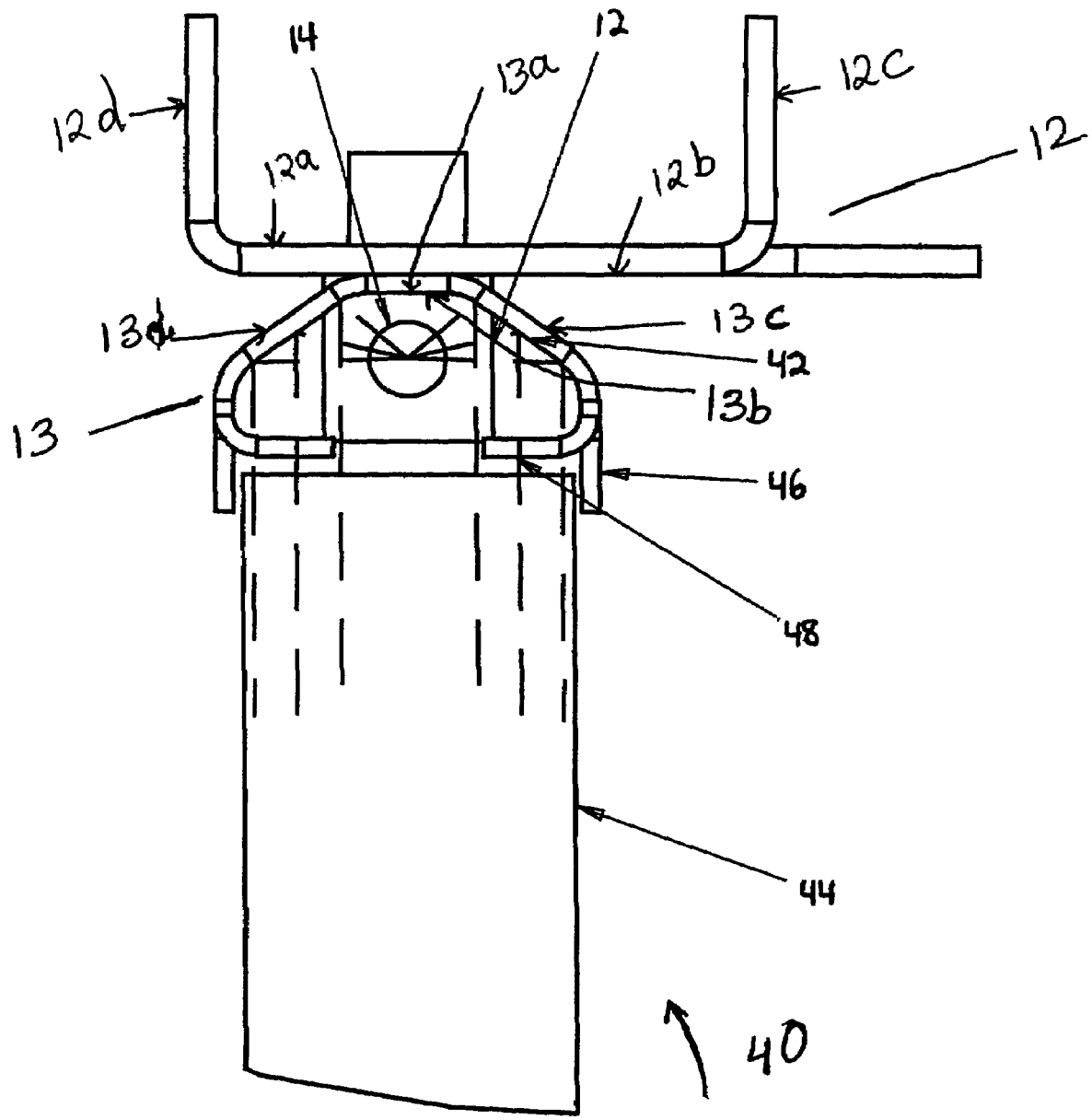
FIG. 4 is a transversal section view of the lower housing with a cold cathode lamp and with an edge-lit panel.

Referring initially to FIGS. 1–3 of the present invention, there is shown a cold-cathode fluorescent lamp assembly 10, mainly utilized for emergency lighting. FIG. 1 shows a perspective view of the component parts of the lamp assembly while FIG. 2 shows a top perspective view of the assembled unit. The assembly 10 is divided into an upper housing unit 10a and a lower housing unit 10b. An exploded perspective view of the upper housing unit 10a and the lower housing unit 10b is shown in FIG. 3A and FIG. 3B respectively. Additionally, a sectional view of the upper housing unit 10a and the lower housing unit 10b is shown in FIG. 3C and FIG. 3D, respectively.

The lower housing unit 10b is made of two frames: an upper frame 12 and a lower frame 13. The upper frame 12 is a generally rectangular planar support frame, preferably made of metal. The upper frame 12 includes a top planar surface 12a, a bottom planar surface 12b and sidewalls 12c and 12d on two long sides of the rectangular frame 12. The lower frame 13 is also a generally rectangular support frame made of metal. The lower frame 13 includes a top planar surface 13a, a bottom planar surface 13b and side walls 13c and 13d on two long sides of the rectangular frame. The lower frame 13 is connected to the upper frame 12. Specifically, the top surface 13a of the lower frame 13 is attached longitudinally along to the bottom surface 12b of the upper frame 12. The lower frame 13 is also known as a reflector frame because the bottom surface 13b is coated with a specular (shiny) metal deposition. Additionally, two independent cold-cathode fluorescent lamps 14a and 14b are disposed longitudinally in the reflector frame 13 as shown in FIG. 1.

The reflector frame 13 of the present invention serves two purposes. First, it orients the light beam and second, it protects the lamp against any mechanical stress. The reflector frame 13 has a parabolic shape for maximum focus towards an edge-lit panel. The reflector 13 preferably has guiding edges and stoppers to guide the edge-lit panel in the lamp proximity while protecting the lamp against the impact with the panel as will be described in detail below with reference to FIG. 4.

Additionally, the upper and lower housings 10a, 10b serve as a packaging for first inverter circuit 16a and a second inverter circuit 16b which are disposed on the top surface 12a of the frame 12. A portion of the side wall 12d is open to accommodate the inverters 16 within the top surface 12a. The top surface 12a of the frame 12 includes a hole at each end through which wires extend to connect the first inverter circuit 16a to lamp 14a and similarly connect the second inverter circuit 16b to lamp 14b. So, the upper frame 12, serves mainly to package the inverters 16 and the reflector frame 13 serves mainly to protect the lamps 14 and guide the light beams. The inverter circuits 16a and 16b are configured to convert the received low-voltage DC battery voltage from an outside power into a high AC voltage appropriate to supply the lamps 14a and 14b respectively as will be discussed below.

Additionally, this assembly 10 represents a redundant light source, i.e., if one of the lamps 14a and 14b or inverter circuit 16a and 16b fails, the other one will continue to light. Each of the lamps, 14a and 14b with their own inverter circuits, 16a and 16b function independent of each other. Further, it is understood that while the lamp assembly 10 is shown having two lamps 14a and 14b, it may have any number of lamps.

The upper housing unit 10a is generally a rectangular planar cover preferably made of metal, is shaped to mate with the frame 12. The cover 10a includes a hole through which preferably a power connector such as a plug 20 is inserted with wires to connect the plug 20 to the inverter circuits 16a and 16b. The plug 20 provides DC line power to the circuits 16a and 16b. Sidewalls of the cover 10a are shaped to fit into slots (not shown) in frame 12. The cover 10a forms a mechanical coupling surface shaped to engage a groove in a housing (not shown in FIGS. 1 and 2) to facilitate insertion and mounting of the assembly 10 to an emergency light sign such as an EXIT sign. Although the lamp assembly 10 is preferably to be made of metal, other materials can be used such as plastic, PVC, etc.

In a preferred embodiment of the present invention, the inverter circuits 16a and 16b in the lamp assembly are provided with a low voltage and power consumption. The plug 20 provides this low voltage DC line power to the inverter circuit 16a and 16b. The voltage power preferably is in the range of 6Vdc to 12Vdc, thereby reducing and/or eliminating the risk of high-voltage hazard. The inverter circuits 16a and 16b preferably include a high frequency switch mode power supply to convert low DC line voltage into a high AC voltage appropriate for lamps 14a and 14b, respectively. The inverter circuits 16a and 16b are made to be extremely compact and 16a and 16b are preferably coupled to a battery charger and/or low-voltage DC back up circuits (not shown) such as, 6V to 12V DC power supply. Therefore, the circuitry in the lamp assembly 10 requires only low voltage to be powered up. Also, all the voltage components such as inverter circuits 16a and 16b, wires etc. are inside the metallic lamp assembly 10, which is electrically grounded to the low-voltage socket. The combination of a lamp assembly powered from a low voltage source and the grounding of the metal housing, protects the user from electrical shock upon installation or relamping even with the exit sign powered by the AC line. Additionally, each inverter 16a and 16b has a built-in fuse to disconnect a faulty or short circuit thereby preventing energy losses at the power supply.

In another preferred embodiment of the present invention, the shape of the reflector frame 13 is parabolic, thereby allowing for a high-efficiency, sharp orientation of the lamp radial beams into a parallel light beams perpendicular to the panel edge. This is clearly displayed in FIG. 4 which shows a combination of the lower housing unit 10b of the lamp assembly 10 with a panel installation 40. The lower housing unit 10b includes the upper frame 12 disposed on the top surface 13a of the reflector frame 13 as shown in FIG. 4. The cold-cathode lamp 14 is supported by the reflector frame 13 having a reflector area 42. A panel 44, preferably an edge-lit panel is essentially rectangular in shape and is preferably made of plastic or other clear materials. The panel 44 is aligned to the lamp assembly by the side walls 13c and 13d of the reflector 13 as shown. As can be seen, the parallel light beams from the reflector 13 and the lamp 14 fall directly into the panel 44 and mainly remains focused therein. The majority of the reflected rays from the light enter the surface of the display panel 44. This is due to the parabolic shape of the reflector 13. The reflector 13 also has built-in panel stoppers 48 to guide the panel 44 in the proximity of the lamp 14 so the light beams stay within the panel 44, thereby further improving photometric efficiency. Additionally, the stoppers 48 protect the lamp 14 against the impact or accidental stress with the panel 44 keeping the lamp 14 intact within the reflector frame 13. Therefore, the parabolic shape reflector frame supporting the lamps provides increased lighting efficiency; mechanical protection of the lamps and guidance for alignment of an edge-lit panel to the lamp assembly.

In the present invention the edge-lit panel shown in FIG. 6 is a rectangular shaped panel 60 formed of acrylic plastic or other clear materials. The panel 60 includes a front side 60a and a backside 60b with a semitransparent frosted surface 61 on its backside 60b. A white, opaque lamination 62 such as plastic, paper is preferably glued on the frosted surface 61 to increase the reflective performance on the panel backside 60b. The legend 64 including the word "EXIT" is printed on the front side 60a of the panel 60 by using two consecutive layers 64a and 64b of semi-transparent materials (screening ink, plastic lamination, etc.). The first layer 64a is white and has the role to split the light. The second layer 64b is colored with either red, green, blue, etc. The light falls from the top edge of the panel 60 as shown by straight vertical lines 66. Part of the light is reflected back into the panel 60 as shown by lines of multiple reflections 67, improving the light uniformity on the background, the other part passes through as shown by lines of multiple refractions 68, and lights the second layer 64b of the legend 64. So, the second layer 64b which is colored and is illuminated by refracted light 68 coming from the panel. With this method, the legend 64 can be internally illuminated, i.e., red looks red in the panel 60 during complete darkness. A legend contour 69 may optionally be engraved on the legend side of the panel 60 as shown in FIG. 6.

The edge-lit panel of the present invention as described above has several advantages. First, there is improved uniformity of the background having a frosted backside, white lamination on the back, and a white legend layer on the front side. Second, due to reflections from the colored layer being eliminated, there is no longer a colored, shadow on the background, i.e., white looks white. Third, the contrast ratio between the legend, i.e., colored layers and the background, i.e., semi-transparent white surface can be controlled by the transparency level of each of the two layers 64a and 64b.

In the edge-lit panel as described above, disclosed with both white layer 64a and colored layer 64b, however, the legend can optionally be printed without the colored layer. Also, an additional transparent layer of protection such as an acrylic can preferably be disposed on the front side 60a over the legend 64. Alternatively, a double-faced edge-lit panel (not shown) can be made by either installing two single-faced panels back-to-back or by bending a double-length acrylic panel in a U-shape form.

While the particular embodiments of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A cold-cathode fluorescent light assembly, comprising:
a lower housing unit and an upper housing unit shaped to cover the lower housing unit, wherein said lower housing unit is divided into an upper frame and a lower frame, said lower frame including a light reflector incorporated therein;
a first and second cathode lamps disposed within said lower frame, wherein said first and second cathode lamps function independent of each other;
a first electrical circuit disposed within said upper frame and connected to said first cathode lamp;
a second electrical circuit disposed within said upper frame and connected to said said second cathode lamp, wherein said first and second electrical circuits function independent of each other.

2. The assembly of claim 1 wherein said upper and lower frames of the housing unit are generally rectangular shaped metallic frames.

3. The assembly of claim 2 wherein said upper housing unit is generally a rectangular shaped metallic frame engaged with the lower housing unit for insertion and mounting of the assembly.

4. The assembly of claim 1 wherein said:
reflector is parabolic in shape to improve reflection of light emitted from the lamps.

5. The assembly of claim 1 wherein said first and second electrical circuits are powered with low DC voltage.

6. The assembly of claim 5 wherein said voltage is in a range of 6Vdc to 12Vdc.

7. The assembly of claim 5 where said first electrical circuit converts the low DC voltage into a high AC voltage to provide power to the first cathode lamp.

8. The assembly of claim 5 wherein said second electrical circuit converts the low DC voltage into a high AC voltage to provide power to the second cathode lamp.

9. The assembly of claim 1 wherein each of said first and second electrical circuits includes a built-in fuse to disconnect a faulty circuit.

10. The assembly of claim 1 wherein each of said first and second electrical circuits is an inverter.

11. The assembly of claim 1 wherein said first and second cathode lamps are spaced apart from each other.

12. A display light sign assembly comprising:
a parabolic-shaped reflector frame having top and bottom surfaces, and side walls extending from at least a first end to a second end;
an upper frame disposed on the top surface of the reflector frame;
at least one cold-cathode fluorescent lamp disposed within said reflector frame wherein said reflector frame reorients radial beams from the lamp into parallel light beams;
at least one essentially semi-transparent elongated, protective panel attached to said reflector frame extending from said first end to said second end, wherein said parallel light beams are directed into the panel.

13. The assembly of claim 12 wherein said frame includes built-in stoppers to guide the panel in proximity with the lamp.

14. The assembly of claim 12 further comprising:
panel guides secured to said panel to align the said frame to the panel.

15. The assembly of claim 12 further includes an inverter connected to the lamp for providing low DC voltage to power the lamp.

16. The assembly of claim 12 wherein said parallel light beams are perpendicular to the panel edge.

17. The assembly of claim 12 wherein said protective panel is an edge-lit panel.

18. The assembly of claim 12 wherein said protective panel is generally rectangular in shape.

19. The assembly of claim 12 wherein said protective panel comprises a single essentially rectangular panel.

20. The assembly of claim 12 wherein said protective panel is plastic.

21. An edge-lit panel comprising:
a front side and a backside, said backside includes a semi-transparent frosted surface;
a white opaque lamination glued on said frosted surface;
a legend printed on said front side using first and second layers of semi-transparent materials; wherein said first layer is white and said second layer is colored such that light passing through said first layer is split in a manner that part of the light is reflected back into the panel and the other part of the light illuminates the second layer.

22. The panel of claim 21 further comprising:
a contour engraved on the legend to accentuate the contrast between the legend and the backside.

23. The panel of claim 21 wherein said reflected light is reflected on the backside of the panel.

24. The panel of claim 21 wherein said part of the refracted light passes through the first layer and illuminates the second layer.

25. The panel of claim 21 wherein said lamination is plastic.

* * * * *

UNITED STATES PATENT AND TRADEMARK OFFICE
CERTIFICATE OF CORRECTION

| | |
|---|---|
| PATENT NO. | : 7,226,195 B2 |
| APPLICATION NO. | : 10/898649 |
| DATED | : June 5, 2007 |
| INVENTOR(S) | : Rapeanu et al. |

It is certified that error appears in the above-identified patent and that said Letters Patent is hereby corrected as shown below:

At column 6, claim 1, line 21, the printed patent incorrectly reads "connected to said said second cathode"; the patent should read --connected to said second cathode--.

Signed and Sealed this

Seventh Day of August, 2007

JON W. DUDAS
*Director of the United States Patent and Trademark Office*